(12) United States Patent
Bonne et al.

(10) Patent No.: US 8,638,204 B2
(45) Date of Patent: Jan. 28, 2014

(54) DRIVER ASSISTANCE SYSTEM

(75) Inventors: Uwe Bonne, Buettelborn (DE); Gerald Schmidt, Frankfurt am Main (DE)

(73) Assignee: GM Global Technology Operations LLC, Detroit, MI (US)

( * ) Notice: Subject to any disclaimer, the term of this patent is extended or adjusted under 35 U.S.C. 154(b) by 118 days.

(21) Appl. No.: 13/334,646

(22) Filed: Dec. 22, 2011

(65) Prior Publication Data

US 2012/0161980 A1 Jun. 28, 2012

(30) Foreign Application Priority Data

Dec. 24, 2010 (DE) .......... 10 2010 056 249

(51) Int. Cl.
*B60Q 1/00* (2006.01)
*G08G 1/09* (2006.01)

(52) U.S. Cl.
USPC ........... 340/435; 340/436; 340/905; 701/301; 180/275

(58) Field of Classification Search
USPC ............... 340/435, 436, 903, 438, 904, 905, 340/425.5; 701/96, 45, 301; 180/169, 167, 180/268, 275; 280/735
See application file for complete search history.

(56) References Cited

U.S. PATENT DOCUMENTS

| | | | | |
|---|---|---|---|---|
| 6,121,896 | A * | 9/2000 | Rahman | 340/902 |
| 7,099,764 | B2 * | 8/2006 | Seto et al. | 701/70 |
| 7,155,342 | B2 * | 12/2006 | Kobayashi et al. | 701/301 |
| 2008/0024284 | A1 * | 1/2008 | Baratoff et al. | 340/435 |
| 2008/0033614 | A1 | 2/2008 | Schiehlen et al. | |
| 2008/0042814 | A1 * | 2/2008 | Hurwitz et al. | 340/435 |
| 2009/0037055 | A1 * | 2/2009 | Danner et al. | 701/45 |
| 2010/0023226 | A1 | 1/2010 | Ito | |
| 2011/0125372 | A1 | 5/2011 | Ito | |

FOREIGN PATENT DOCUMENTS

| | | |
|---|---|---|
| DE | 3637165 A1 | 5/1988 |
| DE | 102004062496 A1 | 7/2006 |
| DE | 102005051539 A1 | 9/2006 |
| DE | 102005018688 A1 | 10/2006 |
| DE | 102005048542 A1 | 4/2007 |
| EP | 1300275 A1 | 4/2003 |

OTHER PUBLICATIONS

German Patent Office, German Search Report for Application No. 102010056249.1, dated Sep. 2, 2011.
UK IPO, British Search Report for Application No. 1121126.5, dated Apr. 25, 2012.

* cited by examiner

*Primary Examiner* — Anh V La
(74) *Attorney, Agent, or Firm* — Ingrassia Fisher & Lorenz, P.C.

(57) ABSTRACT

A driver assistance system includes, but is not limited to at least one environment sensor, an evaluation unit for identifying a potential hazardous traffic situation, and at least one actuator that can be activated by said evaluation unit for executing a warning intervention or a hazard-mitigating intervention according to the degree of hazard of the traffic situation identified by the evaluation unit. The evaluation unit is set up to distinguish at least three degrees of hazard of a potentially hazardous traffic situation and upon determining a degree of hazard that goes beyond that of the hazard-mitigating intervention, to trigger an emergency intervention of the actuator.

12 Claims, 1 Drawing Sheet

DRIVER ASSISTANCE SYSTEM

CROSS-REFERENCE TO RELATED APPLICATION

This application claims priority to German Patent Application No. 102010056249.1, filed Dec. 24, 2010, which is incorporated herein by reference in its entirety.

TECHNICAL FIELD

The technical field relates to a driver assistance system comprising at least one environment sensor, an evaluation unit for identifying a potential hazardous traffic situation, and at least one actuator which can be activated by said evaluation unit for executing a warning intervention or a hazard-mitigating intervention according to the degree of hazard of the traffic situation identified by the evaluation unit.

BACKGROUND

A driver assistance system is known from DE 10 2004 062 496 A1. This conventional system is set up in order, when identifying a potentially hazardous traffic situation initially merely by the warning intervention, e.g., by generating a visual or haptic signal, to draw the driver's attention to the identified hazard, where it is up to the driver himself whether he reacts to the warning intervention or not. If the hazard situation is exacerbated and the warning signals remain unheeded, the known system can execute an autonomous braking intervention, but the deceleration thereof is weaker than that required to avoid a collision. The system is therefore not capable of keeping the hazard situation under control, which results, for example, from falling asleep for a second or a sudden loss of consciousness of the driver.

It would certainly be feasible to execute the autonomous braking intervention with a high deceleration in order to at least increase the probability that a collision can be avoided without an active contribution by the driver. However, this possibility is declined in DE 10 2004 062 496 A1 itself since it enables a misuse of the collision avoidance system as a "distance assistant". It is also unsatisfactory insofar as an intensive braking intervention which is sufficiently strong to impair the driver's control over the vehicle for its part can lead to an increased risk of accident.

It is therefore at least one object to provide a driver assistance system that is capable of autonomously preventing accidents through a strong steering intervention in which at the same time, however, the danger which can arise from a strong autonomous steering intervention is minimized In addition, other objects, desirable features and characteristics will become apparent from the subsequent summary and detailed description, and the appended claims, taken in conjunction with the accompanying drawings and this background.

SUMMARY

A driver assistance system is provided that comprises at least one environment sensor, an evaluation unit for identifying a potential hazardous traffic situation, and at least one actuator which can be activated by said evaluation unit for executing a warning intervention or a hazard-mitigating intervention according to the degree of hazard of the traffic situation identified by the evaluation unit, the evaluation unit is set up to distinguish at least three degrees of hazard of a potentially hazardous traffic situation and upon determining a degree of hazard that goes beyond that of the hazard-mitigating intervention, to trigger an emergency intervention of the actuator. Whereas the warning intervention can still remain unheeded by the driver, when he is situated in a critical traffic situation that requires his full attention, the hazard-mitigating intervention can no longer remain unheeded since it must influence the motion of the vehicle. Since it need not eliminate the hazard identified by the evaluation unit, the hazard-mitigating intervention can nevertheless be dimensioned such that it does not impair the controllability of the vehicle so that the driver can make a correcting intervention without there being the risk of losing control of the vehicle. Since the intensity of the hazard-mitigating intervention can be selected to be sufficiently high in order to reliably eliminate this intervention remaining unnoticed by the driver, it is ensured that the driver is warned before an emergency intervention actually takes place. The emergency intervention must therefore primarily be of sufficient intensity in order to effectively avert an existing danger actually at the last minute.

The warning intervention is preferably suitable for diverting the driver's attention to the potentially hazardous situation without itself influencing the movement of the vehicle. Such a warning intervention has no kind of correcting function and it is merely up to the driver to decide whether he responds to the warning intervention or not. The warning intervention can alternatively also be suitable for reducing the danger arising from the identified traffic situations albeit to a lesser extent than the hazard-mitigating intervention. Such a warning intervention can immediately make it suggestively clear to the driver where the hazard identified by the driver assistance system lies and in this way enables a faster response of the driver.

If the driver assistance system identifies a correcting intervention by the driver, it should expediently interrupt an intervention triggered by it, regardless of which type, in order not to impair the handling autonomy of the driver after he had shown his capability of acting through the correcting intervention. After commencing a warning intervention and/or a hazard-mitigating intervention, the evaluation unit should expediently observe a predefined waiting time in each case before it goes over to the next most intensive intervention in the event that the potentially hazardous traffic situation that has resulted in the warning intervention or the hazard-mitigating intervention, persists. It can thus be ensured that the driver can counteract an intensification of the intervention of the driver assistance system at any time by means of his own correcting intervention.

If the environment sensor is a distance sensor for measurement of the distance from a preceding vehicle, the actuator should expediently act on a vehicle braking system. Then, a braking, a steering, and also acceleration by the driver come into consideration as a correcting intervention that leads to interruption of the intervention of the driver assistance system. A deceleration of the vehicle of more than approximately 0.4 g can only be controlled by the driver with difficulty. The evaluation unit should therefore be set up to effect such a deceleration only in the case of an emergency intervention.

Since the question of the controllability of the vehicle by the driver only plays a subordinate role in the case of an emergency intervention, the deceleration in the case of emergency intervention can correspond to full braking, i.e., in a vehicle fitted with an anti-locking system in a manner known per se, the deceleration can be continued directly as up to the locking limit. As a result of an alternative embodiment, the environment sensor can be a distance sensor for measuring the distance from a lane edge; in this case, the actuator preferably acts on the steering of the vehicle in order to prevent the vehicle leaving the lane when approaching the lane edge too closely. In such a system the evaluation unit is expediently set up to detect a steering of the driver as a correcting intervention and specifically depending on whether the driver's steering results an increase or in a further decrease in the distance from the lane edge.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
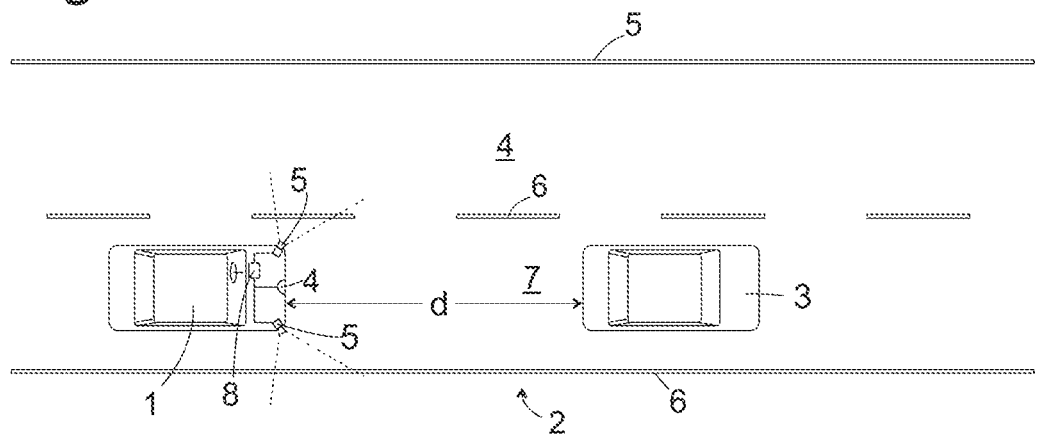
FIG. 1 shows a traffic situation with a vehicle fitted with a driver assistance system according to the invention.

FIG. 1 shows a typical traffic situation which can be handled by the driver assistance system. A motor vehicle 1 fitted with a driver assistance system is moving along a road 2 behind a preceding vehicle 3, which, for example, is suddenly delayed ahead of a road junction, at an end of a queue, or for some other reason which is not identifiable for the driver of the vehicle 1. The driver assistance system of the motor vehicle 1 comprises a plurality of environment sensors such as, for example, a radar sensor 4 for detecting the distance from the preceding vehicle 3, cameras 5, which are aligned towards a right or left boundary marking 6 of the lane 7 of the road 2 on which the vehicle 1 is traveling, in order to determine the distance of the vehicle 1 from the respective boundary 6, a processor unit 8 and sensors not shown for detecting a steering wheel and/or brake pedal actuation.

Figure 2:
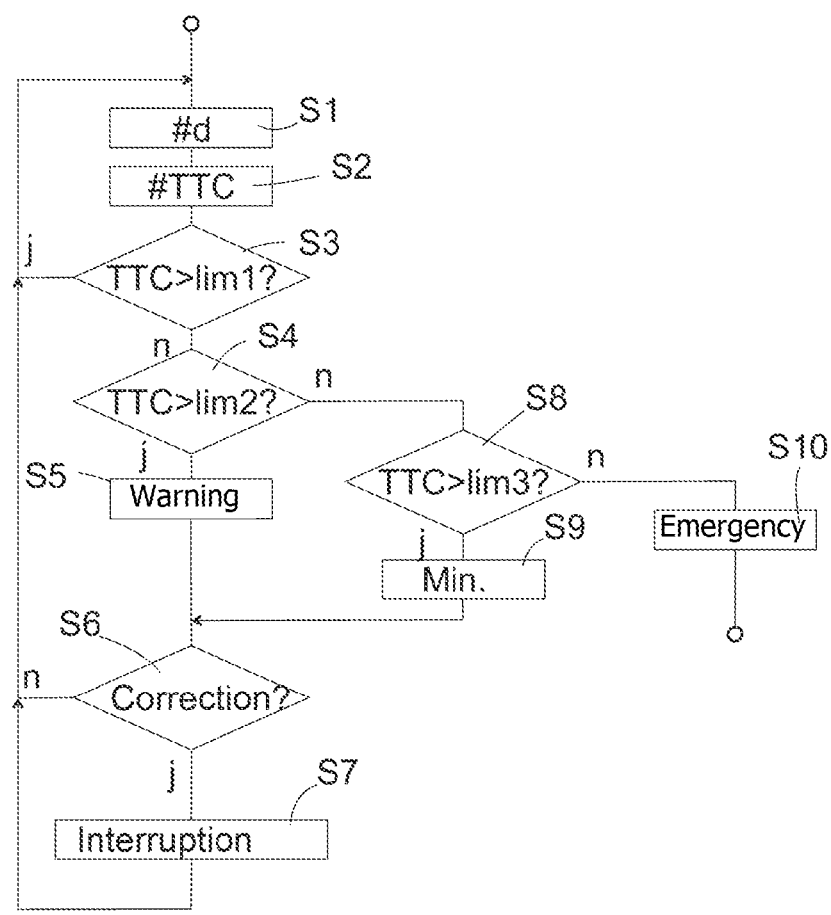
FIG. 2 shows a schematic flow diagram of a working method executed by the driver assistance system

The radar sensor 4 regularly measures the distance d of the vehicle 1 from the preceding vehicle 3 according to step S1 from FIG. 2. By reference to distance measured values obtained earlier, the processor unit 8 extrapolates the future development of the distance d and calculates a time TTC (time to collision) after which the distance d is prospectively 0 (step S2). As long as the result of this calculation is negative, the distance d increases and there is no danger. A slightly critical situation exists it is determined in step s3 that TTC is positive and smaller than a first limiting value lim1 of, for example, approximately 2 seconds. In this case, TTC is initially compared in step S with a second smaller limiting value lim2 of, for example, approximately 1.0 seconds. If TTC>lim2, it is initially sufficient to warn the driver (S5). Such a warning which does not yet influence the movement of the vehicle 1 itself, can, for example, involve triggering an actuator which causes the steering wheel of the vehicle 1 or an accelerator or brake pedal touched by the driver to vibrate and thus makes it clear to the driver that a speed correction is recommended to avert the danger. If as a consequence, in step S6 the processor unit 8 identifies a correcting intervention of the driver, it is assumed that the driver has the situation under control and will take suitable remedial measures and will interrupt the process (S7). Expediently it is subsequently automatically re-started when the current critical situation has been overcome and a new independent hazard situation could arise, i.e., if TTC has in the meantime become greater than limt1 at least once.

An actuation of the brake by the driver which will lead to an increase in TTC or cause it to become negative naturally comes into consideration primarily as a correcting intervention of the driver. However, an actuation of the steering wheel or acceleration can constitute an appropriate correcting intervention if this is used to prepare to overtake the vehicle 3 and therefore also leads to interruption of the process. If no correcting measure is identified in step S6, the process returns to the starting point and since the approach to the vehicle 3 continues without a suitable correction measure, TTC also decreases. If no additional hazard influences are added, after the triggering of the warning in step S5 it therefore takes a fixed time interval $\delta 1 = \text{lim} 2 - \text{lim} 1$ until TTC falls below the second limiting value lim2. This time interval is therefore available to the driver in order to respond to the warning of step S5 through a correcting intervention and thereby avert an intervention of the processor unit 8 in the movement of the vehicle 1.

If it has been determined that lim2 has been fallen below in step S4, a comparison S8 is made with a third, even smaller limiting value lim3. As long as this is not fallen below, it is sufficient if the processor unit 8 triggers a braking as a hazard-mitigating measure S9 that certainly mitigates the risk of collision but is not yet sufficient to eliminate this risk. The braking should be clearly perceptible for the driver but should be controllable without any difficulties; therefore the braking deceleration here is less than approximately 0.4 g. Here the driver still has the opportunity to end the automatic intervention by the processor unit 8 and bring about the interruption S7 of the process through his own correcting intervention which is identified in step S6. If this does not take place, the process goes back to the beginning again where, since the braking of step S8 is not sufficient to prevent the collision, in the next iteration of the process TTC is again smaller. As soon as TTC finally falls below lim3, the processor unit 8 initiates a complete braking S10.

In order to ensure that this complete braking is sufficient to actually avoid a collision, lim3 can be specified as a function of the speed of the vehicle 1. In other words: if a is the maximum deceleration which the vehicle 1 can achieve during braking and v is its speed, then lim3 must be at least v/a in order to be able to avert a collision with a stationary obstacle by full braking. In order that the driver has time to respond to the warning S5 or the hazard-mitigating measure S9 in good time before triggering the full braking, the limiting values lim1, lim2 can also be predefined depending on the vehicle speed and each differ from lim3 by a constant value $\delta 1$ or $\delta 2$.

The method of FIG. 2 can be applied similarly when the monitored distance d is not that from the preceding vehicle 3 but that from an adjacent lane boundary marking 6. Here in particular the triggering of an actuator is considered as warning S5 that causes the steering wheel to vibrate in order to make a steering movement obvious to the driver. As a hazard-mitigating intervention, the actuator can be triggered to exert a small torque on the steering wheel, which can easily be compensated by the driver, by which means, if it is not compensated, the vehicle is steered away from the adjacent lane boundary marking 6 or at least the speed is reduced at which the vehicle approaches the lane boundary marking. If the driver is not in a position to compensate on account of falling asleep for a second or loss of consciousness, such an intervention can, depending on the intensity, already eliminate the risk of leaving the lane or at least lengthen the time available for going below lim2. Then in particular the application of a strong torque to the steering wheel comes into consideration as emergency intervention S10, which brings the vehicle back onto its lane again and which requires a physical effort of the driver to overcome this, if this is desired. Alternatively the emergency intervention S10 here can also be a deceleration of the vehicle 1 to a standstill.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A driver assistance system for a vehicle, comprising:
   an environment sensor and an evaluation unit that are configured to identify a potential hazardous traffic situation;
   an actuator configured for activation by said evaluation unit and further configured to execute three different types of intervention according to a degree of hazard of the potential hazardous traffic situation,
   wherein the evaluation unit is further configured to:
   determine whether a time to collision (TTC) is greater than a first limiting value;
   determine whether the TTC is greater than a second limiting value when the TTC is determined not to be greater than the first limiting value;
   determine whether the TTC is greater than a third limiting value when the TTC is determined not to be greater than the second limiting value;
   trigger a warning intervention when the TTC is determined to be greater than the first limiting value;
   trigger a hazard mitigating intervention when the TTC is determined to be greater than the third limiting value, wherein the hazard mitigating intervention comprises partial braking;
   trigger an emergency intervention of the actuator when the TTC is determined not to be greater than the third limiting value, wherein the emergency intervention comprises complete braking.

2. The driver assistance system according to claim 1, wherein the warning intervention is suitable to diverting a driver's attention to the potential hazardous traffic situation without influencing a movement of the vehicle.

3. The driver assistance system according to claim 1, wherein the warning intervention is suitable to reduce a danger arising from the potential hazardous traffic situation to a lesser extent than a hazard-mitigating intervention.

4. The driver assistance system according to claim 2, wherein the evaluation unit is configured to interrupt the warning intervention upon detection of a correcting intervention by the driver.

5. The driver assistance system according to claim 3, wherein the evaluation unit is configured to observe a predefined waiting time in each case after commencing the warning intervention before going over to the hazard-mitigating intervention in event that the potential hazardous traffic situation persists.

6. The driver assistance system according to claim 1, wherein the environment sensor is a distance sensor configured to measure a distance from a preceding vehicle and the actuator is configured to act on a vehicle braking system.

7. The driver assistance system according to claim 5, wherein the evaluation unit is configured to detect a braking as a correcting intervention.

8. The driver assistance system according to claim 5, wherein the evaluation unit is configured to detect a steering as a correcting intervention.

9. The driver assistance system according to claim 5, wherein the evaluation unit is configured to detect acceleration as a correcting intervention.

10. The driver assistance system according to claim 5, wherein the evaluation unit is configured to bring about a deceleration of the vehicle of more than approximately 0.4 g in the case of the emergency intervention.

11. The driver assistance system according to claim 1, wherein the environment sensor is a distance sensor configured to measure a distance from a lane edge and the actuator is configured to act on the steering of the vehicle.

12. The driver assistance system according to claim 7, wherein the evaluation unit is configured to detect a steering as the correcting intervention.

* * * * *